United States Patent
Loce et al.

(10) Patent No.: US 6,363,177 B1
(45) Date of Patent: Mar. 26, 2002

(54) SYSTEMS AND METHODS FOR ROTATING HIGH ADDRESSABILITY IMAGES

(75) Inventors: Robert P. Loce, Webster; David Glassman; Henry P. Jankowski, both of Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/223,325

(22) Filed: Dec. 30, 1998

(51) Int. Cl.$^7$ ............................................... G06K 15/00
(52) U.S. Cl. ........................................ 382/254; 358/1.9
(58) Field of Search ................................ 382/254, 293, 382/296–300; 358/1.2, 1.9

(56) References Cited

U.S. PATENT DOCUMENTS

| | | | |
|---|---|---|---|
| 4,437,122 A | 3/1984 | Walsh et al. ............... | 358/166 |
| 4,630,125 A | 12/1986 | Roetling ...................... | 358/280 |
| 4,847,641 A | 7/1989 | Tung .......................... | 346/154 |
| 4,933,689 A | 6/1990 | Yoknis ........................ | 346/154 |
| 4,955,065 A * | 9/1990 | Ulichney ..................... | 382/50 |
| 5,005,139 A | 4/1991 | Tung .......................... | 364/519 |
| 5,027,078 A | 6/1991 | Fan ............................ | 358/456 |
| 5,226,094 A | 7/1993 | Eschbach .................... | 382/41 |
| 5,237,646 A | 8/1993 | Bunce ........................ | 395/117 |
| 5,274,472 A | 12/1993 | Williams .................... | 358/455 |
| 5,325,216 A | 6/1994 | Auyeng ...................... | 358/479 |
| 5,353,127 A | 10/1994 | Shiau et al. ................. | 358/456 |
| 5,383,036 A | 1/1995 | Mailloux et al. ........... | 358/518 |
| 5,383,086 A | 1/1995 | Wietelmann et al. ....... | 361/152 |
| 5,387,985 A | 2/1995 | Loce et al. ................. | 358/447 |
| 5,463,720 A * | 10/1995 | Granger ..................... | 395/109 |
| 5,506,699 A | 4/1996 | Wong ......................... | 382/270 |
| 5,521,989 A | 5/1996 | Fan ............................ | 382/270 |
| 5,528,384 A | 6/1996 | Metcalfe et al. ............ | 358/456 |
| 5,553,171 A * | 9/1996 | Lin et al. .................... | 382/299 |
| 5,579,445 A | 11/1996 | Loce et al. ................. | 395/102 |
| 5,634,088 A * | 5/1997 | Banton ....................... | 395/102 |
| 5,659,634 A | 8/1997 | Yeh et al. .................... | 382/232 |
| 5,666,470 A | 9/1997 | Parker ........................ | 395/106 |
| 5,696,845 A | 12/1997 | Loce et al. ................. | 382/254 |
| 5,758,034 A | 5/1998 | Loce et al. ................. | 395/102 |
| 5,768,432 A | 6/1998 | Schweid ..................... | 382/237 |
| 5,809,177 A | 9/1998 | Metcalfe et al. ........... | 382/251 |
| 5,937,147 A * | 8/1999 | Ng ............................. | 395/109 |

FOREIGN PATENT DOCUMENTS

| | | |
|---|---|---|
| EP | 0 696 130 A2 | 2/1996 |
| EP | 0 696 132 A2 | 2/1996 |
| EP | 0 772 156 A2 | 5/1997 |

OTHER PUBLICATIONS

M. Analoui et al., "New Results on Reconstruction of Continuous–Tone from Halftone", Proceedings ICASSP (International Conference on Acoustics, Speech and Signal Processing), pp. 313–316, 1992.

(List continued on next page.)

*Primary Examiner*—Thomas D. Lee
*Assistant Examiner*—Stephen Rinich
(74) *Attorney, Agent, or Firm*—Oliff & Berridge PLC

(57) ABSTRACT

Image rotation systems and methods optimally rotate high addressability binary images by transforming the high addressability image to a quasi-grayscale image having normal addressability. A degree of low-pass filtering may be used in conjunction with resampling the image in the process of generating the normal addressability image for rotation. The quasi-grayscale image is then rotated. The rotated quasi-grayscale image is then converted back to a high addressability binary image using a high addressability halftoning process. The systems and methods provide a process wherein high addressability binary images are rotated without introducing gray-level contours or pattern artifacts such as moiré. Further, the apparatus and method provide compact rotation of high addressability images. The density and edge integrity of the processed image are maintained without introducing false contours.

24 Claims, 6 Drawing Sheets

OTHER PUBLICATIONS

Z. Fan, "Retrieval of Images of Digital Halftones," Proceedings of the International Symposium on Circuits and Systems, pp. 2477–2480, 1992.

S. Floyd et al., "An Adaptive Algorithm for Spatial Grayscale", SID (Society for Information Display), pp. 75–77, vol. 17 No. 2 Second Quarter, 1976.

S. Hein et al., "Reconstruction of Continuous Tone Images from Their Error–Diffused Versions", Proceedings of the Conference on Human Vision, Visual Processing and Digital Display IV, pp. 310–324, (SPIE) vol. 1913, 1993.

C. Miceli et al., "Inverse Halftoning", Journal of Electronic Imaging, pp. 143–151, vol. 1(2), Apr. 1992.

A. N. Netravali et al., "Display of Dithered Images", SID (Society for Information Display) 1980 International Symposium, pp. 185–190, vol. 22 No. 3, 1981.

S. M. Schweiser, "A Bayesian Approach to Inverse Halftoning", Proceedings of the Conference on Human Vision, Visual Processing, and Digital IV, pp. 282–292, vol. 1913, Feb. 1993.

M. Y. Ting, "Error–Diffused Image Compression Using a Binary–to–Gray–Scale Decoder and Predictive Pruned Tree Structured Vector Quantization", IEEE Transactions on Image Processing, vol. 3, No. 6, pp. 854–858, Nov. 1994.

Robert P. Loce et al., "Optimal Morphological Restoration: The Morphological Filter Mean–Absolute–Error Theorem," Journal of Visual Communication and Image Representation, vol. 3, No. 4, pp. 412–432 (12/92).

E.R. Dougherty et al., "Optimal Mean–Absolute–Error Hit–Miss Filters: Morphological Representation and Estimation of the Binary Conditional Expectation," SPIE Journal of Optical Engineering, vol. 32, No. 4, pp. 815–827, Apr. 1993.

Paul G. Roetling et al., "Digital Image Processing Methods: Digital Halftoning (10)", Marcel Dekker, Inc. pp. 363–413 (1994).

Robert P. Loce, et al., "Enhancement and Restoration of Digital Documents: Statistical Design of Nonlinear Algorithms", SPIE—The International Society for Optical Engineering, pp. 1–50 and 102–125 (1997).

Becky Colgan et al., *Behind Hewlett–Packard's Patent on Resolution Enhancement™ technology*, Torrey Pines Research, BIS CAP International, 1990, pp. 1–60.

Robert P. Loce et al.; *Facilitation of Optimal Binary Morphological Filter Design via Structuring Element Libraries and Design Constraints*, Optical Engineering, vol. 31, No. 5, May 1992, pp. 1008–1025.

Edward R. Dougherty ed., Marcel Dekker; *Mathematical Morphology in Image Processing*, pp. 43–90 (1992).

Robert P. Loce and Edward R. Dougherty; *Spatial Resolution Conversion Using Paired Increasing Operators*, Enhancement and Restoration of Digital Document, pp. 202–210, SPIE Optical Engineering Press, 1997.

David R. Cok; *Reconstruction of CCD Images Using Template Matching*, IS&T's 47$^{th}$ Annual Conference/ICPS 1994, pp. 380–385.

Edward R. Dougherty et al.; *Optimal binary differencing filters: design, logic complexity, precision analysis, and application to digital document processing*, Journal of Electronic Imaging, Jan. 1996, vol. 5, No .1, pp. 66–86.

John C. Dougherty et al.; *Model–based optical restoration of fax images in the context of mathematical morphology*, Journal of Electronic Imaging, Apr. 1994, vol. 3, No. 2, pp. 182–189.

* cited by examiner

SYSTEMS AND METHODS FOR ROTATING HIGH ADDRESSABILITY IMAGES

BACKGROUND OF THE INVENTION

1. Field of Invention

This invention relates to systems and methods for optimally rotating high addressability images. More specifically, this invention relates to systems and methods for rotation of high addressability halftoned images using filtering, resampling and halftoning techniques while minimizing the presence of contours in the rotated image.

2. Description of Related Art

The digital reproduction, transfer or display of various images presently occurs using a variety of devices and systems in a variety of environments. The image may be input into a device, processed in some manner, and then output from the device, for example. In some applications, it may be necessary or desirable to convert the image between the input and the output of one device for the specific purpose of using the converted image data by another device. In other applications, it may be necessary or desirable to convert the input image for some particular application within a device itself.

Images are represented in a wide variety of manners using various techniques. Illustratively, an image may be represented in the form of a grayscale image commonly referred to as a continuous tone image. In such a representation, multiple grayscale values are used to create the varying portions of the image. Such a grayscale image may be composed of pixels that possess values in the range of 0–255, for example, resulting in the image possessing 256 possible grayscale values.

Further, images may be represented in binary form. Illustratively, a continuous tone image may be converted or "halftoned" and represented in a binary form. In a binary form, an image is represented by creating halftone cells or dots. Each cell represents a grayscale value within an area of pixels. The pixels in the binary image may be either on or off, i.e., black(1) or white(0), respectively. By turning the pixels in an area of the binary image on or off, a grayscale value may be simulated. As a result, the binary image can replicate the entire grayscale image without using continuous tones.

In particular, the binary image may be a high addressability binary image. A high addressability binary image is an image created by a device such that the spatial addressability of the writing spot is finer than the size of the writing spot. High addressability also often refers to an addressability resolution in a first direction is finer than the spatial addressability resolution in a second direction perpendicular to the first direction, for example.

Illustratively, FIG. 1 is a diagram showing a high addressability pixel grid. As shown in FIG. 1, the spatial addressability of the pixels in the horizontal direction, i.e., the fast scan direction, is finer than in the vertical direction, i.e., the slow scan or process direction. For a flying spot laser scanner, the fast scan direction is the direction in which a laser beam of a printer, for example, sweeps to print an image on a recording medium. The recording medium may be a xerographic photoreceptor that will develop and transfer onto a sheet of paper, for example. The photoreceptor is advanced in a direction perpendicular to the fast scan direction, i.e., the slow scan or process direction. The photoreceptor may be advanced using rollers for a belt-type device, or as a rotating drum, as is commonly used in a printer, for example. Note that other writing devices also have high addressability capability such as an LED image bar writer. In these other devices the orientation of the grids may be rotated, but the underlying concept is the same.

FIG. 1 shows the size of a nominal pixel and a high addressable pixel, as well as the size of a writing spot. The addressability in the fast scan direction is controlled by a laser beam modulator, for example. The addressability in the slow scan or process direction is controlled by the photoreceptor advance mechanism of the printer or copier. The laser beam is capable of modulation to a resolution of the high addressable pixel. However, the photoreceptor advance mechanism is not capable of such fine resolution. Rather, the paper feed mechanism is only capable of a nominal pixel resolution.

Various methods for image processing are known. These methods may encompass processing using scanning, or other image acquisition, in conjunction with printing or display of the image. Input scanners typically acquire image information possessing 256 levels of gray to represent a spot or pixel in the scanned image. In general, image output devices such as printers, for example, are only capable of creating spots within an area with a limited predetermined spatial resolution. In contrast to the gray-scale resolution of a scanner, output devices generally use only two gray-scale levels, or some other relatively small number of levels, available to reproduce image information. As a result, output devices commonly contend with excess gray-scale resolution information by quantizing the image data through halftoning techniques to represent the image as a halftone, i.e., a binary image possessing two grayscale levels.

Conventional digital halftoning devices can suffer from image quality degradations, such as too few perceived gray levels. One solution is to perform halftoning on a very high resolution device. Such a high resolution device may have resolution equal to or greater than 2400 spots per inch, for example. However, using high addressability techniques, a device may be able to achieve a sufficient number of perceived gray-levels without resorting to increasing the full spatial resolution in both the fast scan and process directions. Illustratively, high addressability methods conventionally typically involve modulating a writing member, such as a laser beam, at spatial increments finer than the size of the writing spot. Using high addressability imaging and modulation allows a particular device's spatial resolution to be improved or increased.

Accordingly, high addressability techniques use modulation to increase printer spatial resolution without modifying the physical printer device. As described above, high addressability techniques may be used to affect the horizontal spatial resolution. For example, doubling the printer modulation rate results in doubling the horizontal spatial resolution, while keeping the vertical spatial resolution unchanged.

SUMMARY OF THE INVENTION

However, problems are present in conventional methods when inputting, manipulating and outputting high addressability binary images. In particular, problems occur in the conventional methods when rotating high addressability binary images. In a variety of devices and operating environments, it is often necessary or desirable to rotate images. The image may be a grayscale image or a binary image. More specifically, the binary image may be a high addressability image. In conventional methods and systems, rotating a grayscale image typically does not introduce defects or artifacts into the image. However, rotating a binary, high addressability image can result in gray-level contours in halftones and jagged edges in the line art and text portions of the rotated image.

Conventional rotation methods can cause defects and artifacts in an image. Further, conventional rotation methods are typically intended for use in rotating images that are of isomorphic resolution (same in vertical and horizontal directions). For example, a conventional technique may be used to rotate an image of pixels by −90°. As a result of this rotation with high addressability images, gray-level contours may be introduced into the rotated image. These contours, and other image artifacts, introduced using conventional rotation techniques, are highly objectionable.

Accordingly, this invention provides systems and methods that optimally rotate a high addressability binary image.

This invention separately provides systems and methods for rotating a high addressability binary image without increasing the bit count of the image.

This invention separately provides systems and methods for rotating high addressability binary images without introducing gray-level contours.

This invention separately provides systems and methods for rotating high addressability images that minimize any introduced graininess in a rotated image.

This invention separately provides systems and methods for rotating high addressability images that minimize any introduced moiré or pattern artifacts in a rotated image.

This invention separately provides systems and methods that slightly blur the high addressability binary image, convert the image into a grayscale image, convert the image into a isomorphic image using resampling, rotate the image, and convert the rotated image back to a high addressability binary image.

In one exemplary embodiment of the systems and methods of the invention, contour-free rotation of high addressability halftone images is obtained. The systems and methods of this invention low-pass filter and resample the high addressability binary image. The filtered and resampled image data results in a quantization of the high addressability binary image and forms a hybrid binary image, i.e., a quasi-grayscale image. The hybrid binary image is then resampled to isomorphic resolution and rotated. In particular, the hybrid binary image is rotated using conventional rotation techniques, and is rotatable without increasing the bit count and without introducing any gray-level contours. After rotation, the hybrid binary image may be processed using a high addressability halftoning technique preferably having some randomness, such as an error diffusion process, for example, to obtain a rotated high addressability image.

In accordance with another exemplary embodiment of the systems and methods according to the invention, an anamorphic high addressability binary image is input. The "anamorphic" image, due to the high addressability, possesses different spatial resolutions in mutually perpendicular directions. For example, the spatial resolution in the horizontal direction is finer than the spatial resolution in the vertical direction. In accordance with the systems and methods of the invention, the anamorphic high addressability binary image is quantized to convert it to an isomorphic quasi-grayscale image. This isomorphic quasi-grayscale image possesses the same spatial resolution in mutually perpendicular directions. For example, the spatial resolution in the horizontal direction is the same as the spatial resolution in the vertical direction.

The quasi-grayscale image is not a true grayscale image. That is, a true grayscale image includes pixels that may possess any one of 256 grayscale values, in a range of 0–255. The quasi-grayscale image processed in accordance with the systems and methods of this invention is not so finely quantized. Rather, the quasi-grayscale image may perhaps possess only four levels of quantization for a system with resolution four times greater in one dimension than the other, for example.

Once the input image is quantized, the isomorphic quasi-grayscale image is rotated using conventional rotation techniques. After rotation, the rotated isomorphic quasi-grayscale image is processed using a halftoning technique, i.e., a high addressability halftoning technique, to generate a rotated high addressable anamorphic binary image. It should also be appreciated that the systems and methods according to the invention are applicable to a wide variety of image processes, beyond rotating a high addressability binary image prior to printing.

Thus, it should be recognized that the systems and methods described herein can be used in conjunction with various other processes and systems. For example, the systems and methods disclosed herein may be used in conjunction with or combined with the systems and methods disclosed in co-pending U.S. patent application Ser. No. 09/233,266 filed herewith, which is directed at optimally rotating line art, for example, and which is incorporated herein by reference in its entirety.

The systems and methods of the invention utilize a series of conventional image processing techniques in a series of steps. Further, the systems and methods of the invention do not require the increase of the bit count of an image to perform the rotation of the image. Since the bit count is not increased, the cost of implementing the rotation process in accordance with the invention is minimized.

These and other features and advantages of the systems and methods of this invention are described in or are apparent from the following detailed description of the exemplary embodiments.

BRIEF DESCRIPTION OF THE DRAWINGS

The exemplary embodiments of this invention will be described in detail, with reference to the following figures, wherein.

DETAILED DESCRIPTION OF PREFERRED EMBODIMENTS

Figure 2:
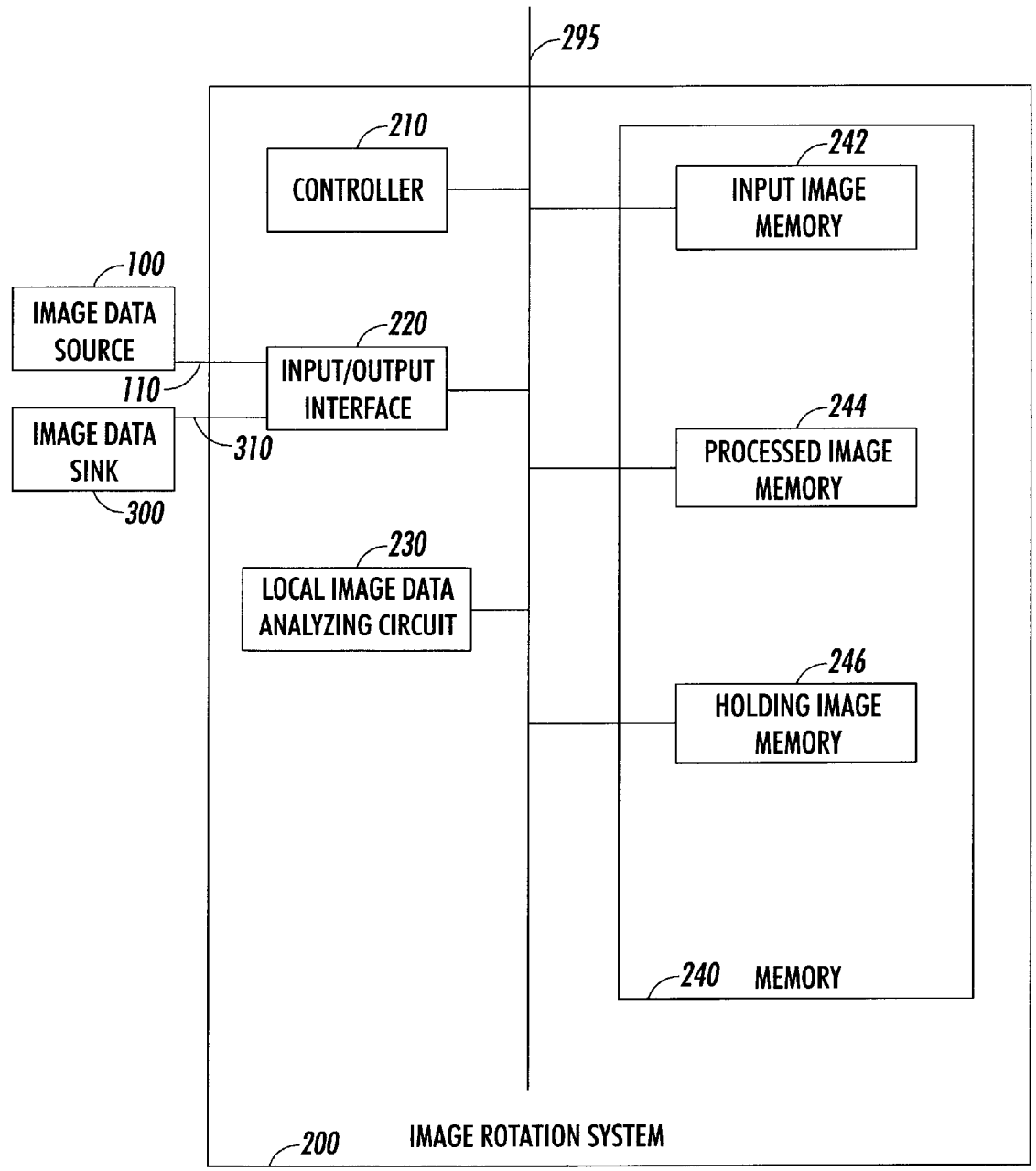
FIG. 2 is a functional block diagram of one exemplary embodiment of a system for image rotation in accordance with this invention.

FIG. 2 shows one exemplary embodiment of a generalized functional block diagram of an image rotation system 200 according to this invention. The image rotation system 200 is connected to an image data source 100 over a signal line or link 110 and to an image data sink 300 over a signal line or link 310. The image data source 100 provides a wide variety of image data to the image rotation system 200. The image data sink 300 receives processed images output by the image rotation system 200.

In general, the image data source 100 can be any one of a number of different sources, such as a scanner, a digital copier, a facsimile device that is suitable for generating electronic image data, or a device suitable for storing and/or transmitting electronic image data, such as a client or server of a network. Further, the image data source 100 does not necessarily have to be a single device, but rather may be formed by two or more separate devices.

Thus, the image data source 100 can be any known or later developed source that is capable of providing monochrome or color data to the image rotation system 200 of this invention. Similarly, the image data sink 300 can be any known or later developed device that is capable of receiving the processed image data output by the image rotation system 200 and either storing, transmitting, and/or displaying that processed image data. Thus, the image data sink 300 can be either or both of a channel device for transmitting converted image data or enhanced image data, for example, for display or storage or a storage device for indefinitely storing the image data until there arises a need to display or further transmit the image data.

Further, the image data sink 300 or channel device can be any known structure or apparatus for transmitting the image data from the image rotation system 200 to a physically remote storage or display device. Thus, the channel device can be a public switched telephone network, a local or wide area network, an intranet, the Internet, a wireless transmission channel, any other distributing network, or the like.

Similarly, the storage device can be any known structural apparatus for indefinitely storing the image data, such as a RAM, a hard drive and disk, a floppy drive and disk, an optical drive and disk, a flash memory or the like. Finally, the display device can be any known device for displaying or rendering an image. Thus, the display device can be a CRT, an active or passive matrix LCD, an active or passive LED display, a laser printer, an ink jet printer, a digital copier, or the like.

Moreover, the image data source 100 and the image data sink 300 can be physically remote from the image rotation system 200 and reachable over the channel device described above. Alternatively, the image rotation system 200 can be integrated with either or both of the image data source 100 and the image data sink 300. For example, the image data source 100 can be a scanner of a digital photocopier, while the image data sink 300 is an image output terminal of the digital copier.

As shown in FIG. 2, the image rotation system 200 includes a controller 210, an input/output interface 220, a local image data analyzing circuit 230 and a memory 240, each of which is connected to a data bus 295. The input/output interface 220 is also connectable to the image data source 100 and the image data sink 300 over the signal lines or links 110 and 310, respectively.

Additionally, as shown in FIG. 2, the memory 240 includes an input image memory 242, a processed image memory 244 and a holding image memory 246. The input image memory 242 temporarily stores image data, prior to rotation, that has been input into the image rotation system 200. The processed image memory 244 temporally stores rotated image data that has been processed by the image rotation system 200 prior to outputting of the rotated image. The holding image memory 246 stores image data on a long term basis either before or after rotation. The image data may be input from the image data source 100 through the input/output interface 220, or, alternatively, may result from converting an image previously stored in the image rotation system 200, and specifically stored in the holding image memory 246.

The memory 240 also stores any necessary control programs and/or data required by the image rotation system 200. Thus, the memory 240 can be implemented using static or dynamic RAM, a floppy disk and disk drive, a writable optical disk and disk drive, a hard disk and disk drive, flash memory, or the like. The memory 240 can also include read only memory, including PROMs, EPROMs, EEPROMs, a CD-ROM and disk drive, or the like.

In accordance with the systems and methods of this invention, a binary image may be rotated using the image rotation system 200 shown in FIG. 2. In particular, the image rotation system 200 may be used to rotate a high addressability binary image, while minimally degrading the image during rotation.

Figure 3:
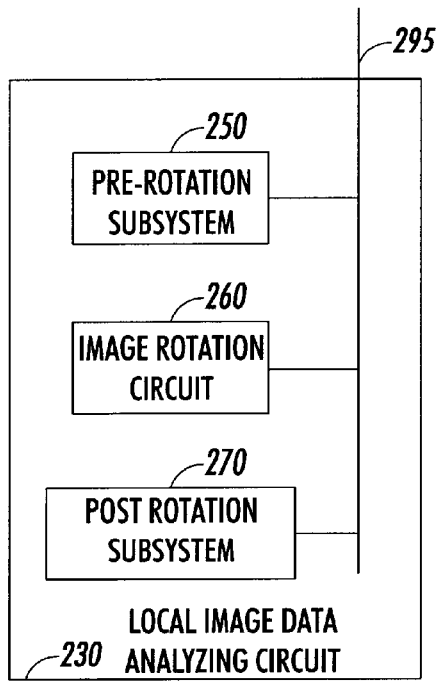
FIG. 3 shows in greater detail one exemplary embodiment of a functional block diagram of the local image data analyzing circuit of FIG. 2 in accordance with this invention.

FIG. 3 shows in greater detail one exemplary embodiment of a functional block diagram of the local image data analyzing circuit 230 of FIG. 2. As shown in FIG. 3, the local image data analyzing circuit 230 includes a pre-rotation subsystem 250, an image rotation circuit 260 and a post-rotation subsystem 270. The pre-rotation subsystem 250 analyzes and prepares the image prior to rotation of the image. The image rotation circuit 260 rotates the image. After the image has been rotated, the post-rotation subsystem 270 performs various processes on the rotated image to generate an output image. These various processes may include a halftoning process or other screening process, for example. The pre-rotation subsystem 250, the image rotation circuit 260 and the post-rotation subsystem 270 are all connected to the data bus 295.

Figure 4:
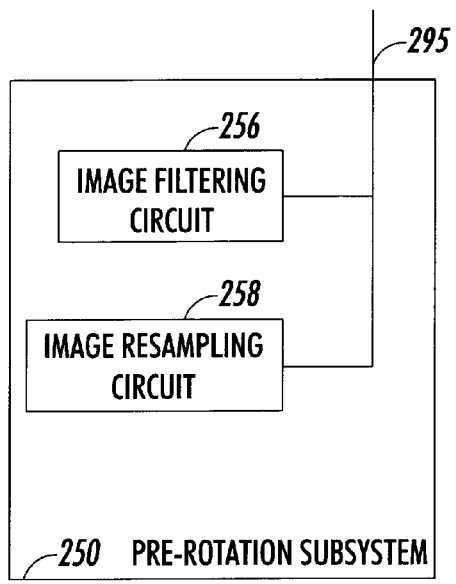
FIG. 4 shows in greater detail one exemplary embodiment of a functional block diagram of the pre-rotation subsystem of FIG. 3 in accordance with this invention.

FIG. 4 shows in greater detail one exemplary embodiment of a functional block diagram of the pre-rotation subsystem 250 of FIG. 3. As shown in FIG. 4, the pre-rotation subsystem 250 includes an image filtering circuit 256 and an image resampling circuit 258, each connected to the data bus 295. The image filtering circuit 256 performs any of a variety of filtering processes on the image prior to rotation. For example, the filtering processes may include filtering operations known as low-pass filters. Low-pass filters perform weighted averaging of neighboring pixels. Further, the image resampling circuit 258 performs any of a variety of resampling processes on the image after filtering but prior to rotating. The resampling is performed to eliminate the difference in sampling rate in the two dimensions, hence yielding an image with isomorphic sampling suitable for conventional rotation. The filtering and averaging processes performed by the image filtering circuit 256 and the image resampling circuit 258 convert or quantize the high addressability binary image to a quasi-grayscale image, which may be rotated using conventional rotation techniques without introducing contours or other image artifacts into the image. The sampling process reduces the high addressability of the image to isomorphic addressability.

Figure 5:
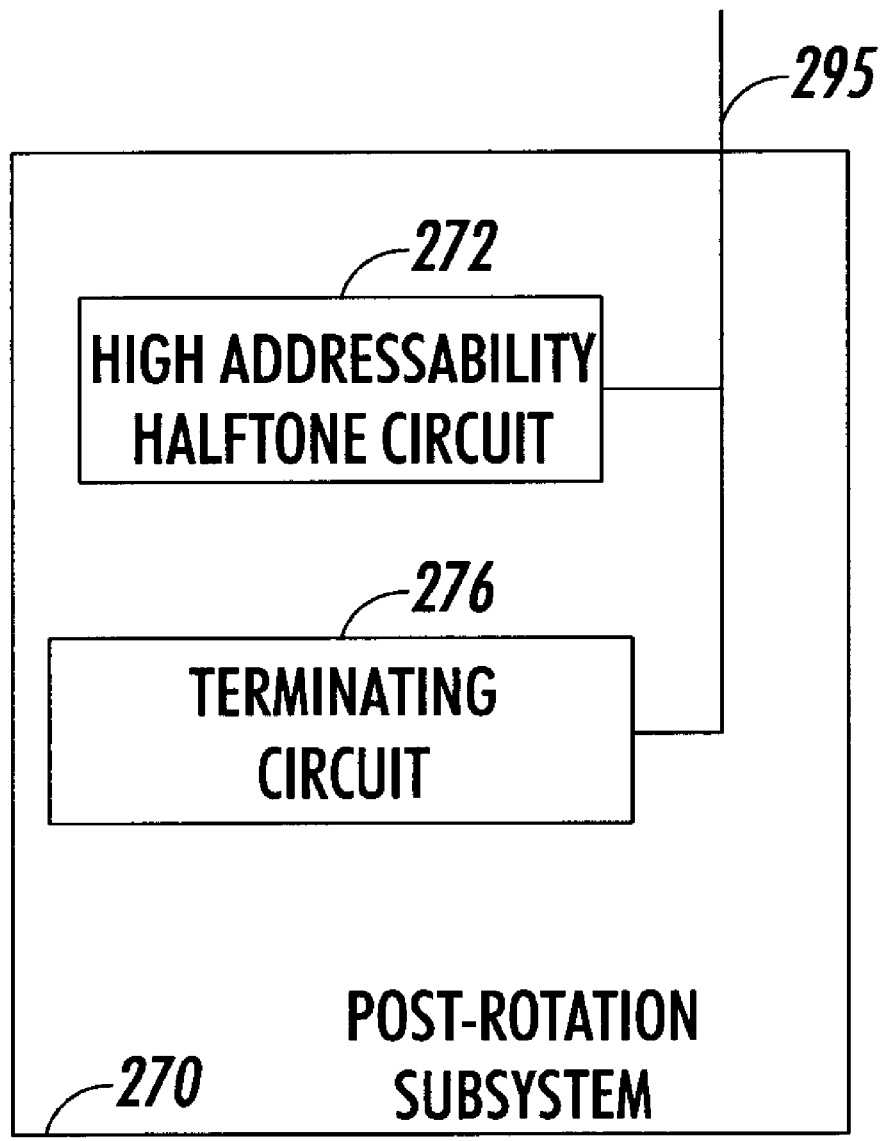
FIG. 5 shows in greater detail one exemplary embodiment of a functional block diagram of the post-rotation subsystem of FIG. 3 in accordance with this invention.

FIG. 5 shows in greater detail one exemplary embodiment of a functional block diagram of the post-rotation subsystem 270 of FIG. 3. As shown in FIG. 5, the post-rotation subsystem 270 includes an image high addressability halftone circuit 272 and a terminating circuit 276, each connected to the data bus 295. The image high addressability halftone circuit 272 re-halftones the rotated image after rotation by the image rotation circuit 260. In effect, the image high addressability halftone circuit 272 performs that operation in two steps. The first step is to resample the image to the desired high addressability. In the first step, supersampling using replication, or some other form of interpolation may be used. The second step is to apply halftone thresholds. Additionally, the terminating circuit 276 terminates the rotation process and outputs or stores the processed image after rotation.

In operation, an image to be rotated, i.e., an "original image" is input into the image rotation system 200 or, alternatively, retrieved from the holding image memory 246 of the image rotation system 200. In this exemplary embodiment, the original image is a high addressability binary image.

The original high addressability binary image to be rotated includes high addressability pixels. As a result, the original high addressability binary image is an anamorphic image. That is, the resolution of the original high addressability binary image in the horizontal direction is finer than the resolution in the vertical direction, for example. The systems and methods of this invention convert this anamorphic image to an isomorphic image prior to rotating the original image. More specifically, after inputting the original high addressability binary image, the pre-rotation subsystem 250 converts the high addressability pixels to pixels having increased grayscale quantization, i.e., converts the original high addressability binary image to a quasi-grayscale image. The pre-rotation subsystem 250 also resamples the image to isomorphic resolution.

To accomplish this process, the image filtering circuit 256 of the pre-rotation subsystem 250 performs a filtering process on the original high addressability binary image. Specifically, for example, an amount of low-pass filtering is applied to the original high addressability binary image. A filter may be characterized as an operator or device that transforms one image, i.e., the original high addressability binary image, into another image. In particular, a low-pass filter attenuates, i.e., decreases, the intensity of the high spatial frequencies of an image and passes the low spatial frequencies of an image generally unaltered.

A low-pass filtering process may be understood as an averaging process, since the low-pass filter averages neighboring pixels. As a result, low-pass filtering often results in the blurring of an image since the high-frequency spatial components are averaged out to decrease the intensity of the high-frequency components, i.e., the high-frequency components smoothed out. Low-pass filters are commonly used to smooth an image or to suppress small details, which may be undesired.

Further, low-pass filtering is a conventional method by which a grayscale image is reconstructed or originally constructed from a binary image. A low-pass filter transforms certain observed pixel patterns in the binary image, i.e., in a windowed neighborhood of the binary image, into a corresponding grayscale value for the target pixel in that window. The neighborhood may include various numbers of pixels, such as three to nine pixels, for example. As a result, processing using the low-pass filter results in a more finely quantized image than the original binary image. That is, the resulting image will possess more grayscale levels. The specific degree of quantization, i.e., how many grayscale levels, will vary depending on the particular application. For example, four levels of quantization may be used.

Figure 6:
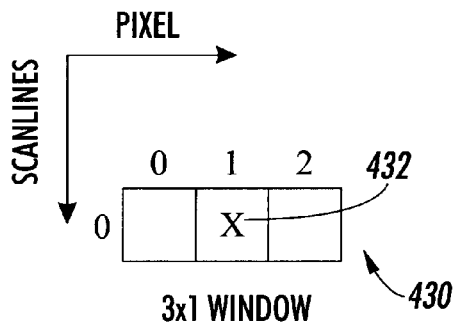
FIG. 6 is a diagram showing one exemplary window in accordance with this invention.

Accordingly, the image filtering circuit 256 in accordance with the invention uses a window to scan across the original high addressability binary image. The image filtering circuit 256 moves the window from target pixel to target pixel. Any suitable known or later developed window may be used. For example, as shown in FIG. 6, the window may be a 3×1 window 430, which has 3 pixels. That is, the neighborhood includes all the pixels in the window. Further, a target pixel 432 may be the center pixel. For each target pixel, the image filtering circuit 256 observes a neighborhood of pixels.

The pixels in each neighborhood will either be on or off. The neighborhood will be said to possess a particular pattern depending on which pixels are on or off. The image filtering circuit 256 will transform a certain observed pixel pattern into a corresponding grayscale value and associate that grayscale value with the target pixel of the neighborhood. For example, it may be necessary or desired to use a quasi-grayscale image possessing four levels, i.e., the levels of 0, 85, 170 and 255. If no pixels in the neighborhood are on, the target pixel in the neighborhood will be assigned a grayscale value of 0. Alternatively, if all the pixels in the neighborhood are on, the target pixel for the neighborhood will be assigned a grayscale value of 255. Further, if some of the pixels in the window are on and some are off, the target pixel may be assigned a value of 85 or 170, for example, depending on the number of pixels that are on or off, for example.

However, it should be recognized that simply determining the number of pixels that are on or off in the observed window is not necessarily sufficient to determine the grayscale value to be assigned to the target pixel for that window. Rather, the filter 430 used by the image filtering circuit 256 uses information regarding the particular position of the "on" pixels, as well as the total number of on pixels, in determining which grayscale value to assign to a particular target pixel.

The specific technique which the image filtering circuit 256 uses to accomplish the filtering process, i.e., the transformation process, may vary between applications. In accordance with one exemplary embodiment of the systems and methods of the invention, the image filtering circuit 256 uses a look-up table. A look-up table is a collection or list of possible templates or pixel patterns. The templates in the look-up table are compared with observed values in a windowed neighborhood of an image to be transformed or converted. That is, the image filtering circuit 256 may use filters that operate by outputting a specified grayscale value at locations where a particular binary pattern, within the image, match patterns within the look-up table.

Accordingly, the image filtering circuit 256 transforms or filters the high addressability binary original image to a quasi-grayscale image by analyzing target pixels. This process will continue until the last target pixel in the original image is analyzed. The resulting quasi-grayscale image will still be a high addressability image, and will still retain anamorphic characteristics.

Figure 1:
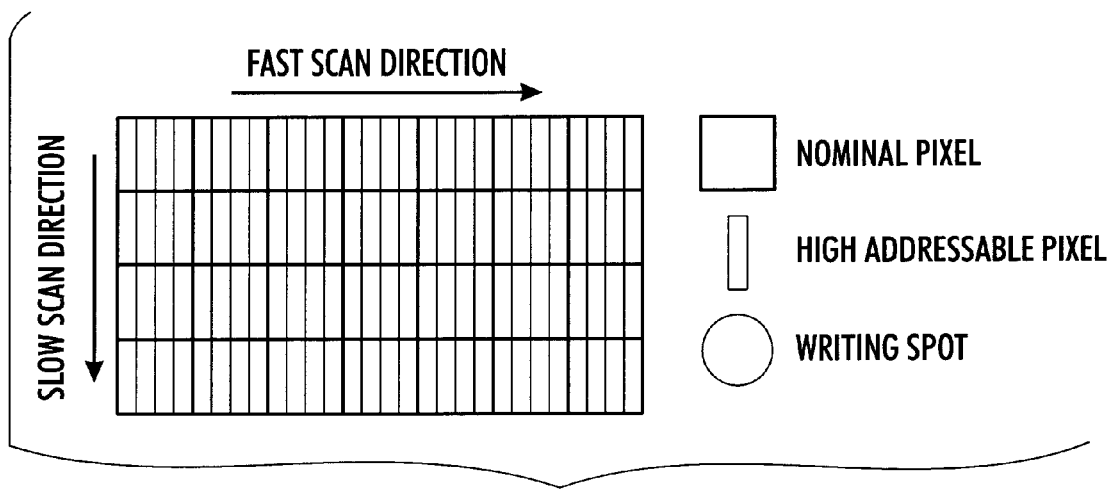
FIG. 1 is a diagram showing an exemplary conventional high addressability pixel grid.

Thus, the image resampling circuit 258 transforms the quasi-grayscale image generated by the image filtering circuit 256 to a isomorphic grayscale image. Specifically, the image resampling circuit 258 processes the anamorphic quasi-grayscale image using a sampling process. Illustratively, referring to the pixel grid shown in FIG. 1, the image resampling circuit 258 scans the anamorphic quasi-grayscale image and acquires samples at isomorphic resolution.

Thus, the pre-rotation subsystem 250 averages the high addressable pixels and resamples them to yield isomorphic pixels possessing suitable quantization. As a result, the isomorphic quasi-grayscale image may be easily rotated by the image rotation circuit 260 in the local image data analyzing circuit 230. It should be recognized that the pre-rotation subsystem 250 may perform the low-pass filtering process and the averaging process as separate processes, or alternatively, the two processes may be combined into a single process performed by a single combined image filtering and resampling circuit, where filtering is performed only at locations where a resampled value is desired.

Figure 7:
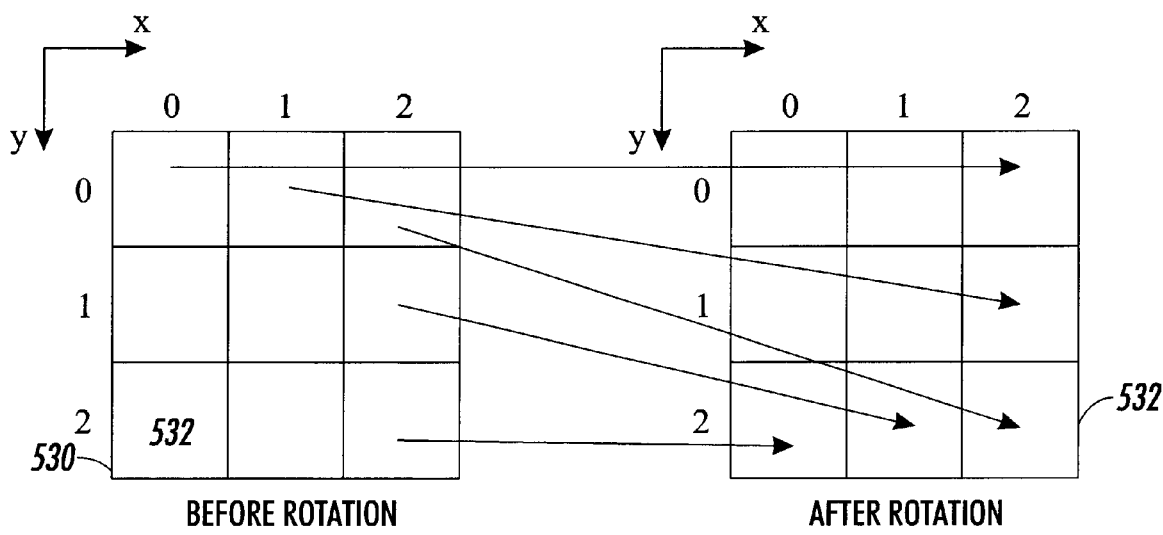
FIG. 7 is a diagram showing one exemplary mapping technique in accordance with this invention.

After the pre-rotation subsystem 250 generates the isomorphic quasi-grayscale image, the image is rotated. This process is performed by the image rotation circuit 260. The image rotation circuit 260 rotates the quasi-grayscale image using any of a variety of known or later developed rotation processes. Illustratively, FIG. 7 shows two pixel grids. The pre-rotation grid 530 shows an arrangement of pixels before rotation. Further, the post-rotation grid 532 shows an arrangement of pixels after rotation by +90°. Each of the pixels in the grid 530 is denoted by $P_{BR}(x,y)$, where x=0–2 in the x-direction and y=0–2 in the y-direction. Further, each of the pixels in the grid 532 is denoted by $P_{AR}(x,y)$, where x=0–2 in the x-direction and y=0–2 in the y-direction. To rotate the pixel grid 530 by +90°, the image rotation circuit 260 uses a mapping technique. Specifically, to rotate the pixel grid 530 +90°, the image rotation circuit 260 maps the pixels as follows:

$P_{BR}(0,0)$ to $P_{AR}(2,0)$;   $P_{BR}(1,1)$ to $P_{AR}(1,1)$;
$P_{BR}(1,0)$ to $P_{AR}(2,1)$;   $P_{BR}(2,1)$ to $P_{AR}(1,2)$;
$P_{BR}(2,0)$ to $P_{AR}(2,2)$;   $P_{BR}(0,2)$ to $P_{AR}(0,0)$;
$P_{BR}(0,1)$ to $P_{AR}(1,0)$;   $P_{BR}(1,2)$ to $P_{AR}(0,1)$; and
                                  $P_{BR}(2,2)$ to $P_{AR}(0,2)$.

Once the quasi-grayscale image is rotated, the rotated quasi-grayscale image is input to the post-rotation subsystem 270. More specifically, the image high addressability halftone circuit 272 of the post-rotation subsystem 270 re-halftones the rotated quasi-grayscale image using a high addressability process that preferably possesses some random structure. Illustratively, the image high addressability halftone circuit 272 uses a conventional error diffusion process or a conventional stochastic screening process, for example.

More specifically, the image high addressability halftone circuit 272 may use an error diffusion process which can be referred to as a neighborhood process. Error diffusion uses the concept of fixing the total gray content of the image by calculating a brightness error that occurs upon binarizing a pixel. This error is then incorporated into the processing of subsequent pixels. To explain further, in an error diffusion process, a particular pixel is observed. If the grayscale value of that pixel is over a specified level "T", for example over T=128, the pixel will be assigned a 1. That is, the pixel will be converted to black. Otherwise, the pixel will be converted to white. This process is referred to threshholding the pixel at a level T to the binary state.

However, the input grayscale value of the pixel may not be exactly white or black. As a result, when the pixel is threshholded, there is some error present. In the error diffusion process, this error is distributed to pixels that have not yet been processed, i.e., pixels that have not been binarized. Further, the error may be distributed in some type of a weighted manner. For example, the pixel immediately ahead of the binarized pixel in the raster line may receive a first weighted portion of the error, while adjacent pixels in the next raster line will receive a different weighted portion of the error.

Accordingly, the error diffusion process used by the image high addressability halftone circuit 272 converts the rotated quasi-grayscale image to a high addressability binary image. Specifically, the error diffusion process resamples the image to provide a finer resolution in the fast scan direction, i.e., in the direction along the raster line. The resampling may be performed using well known interpolation methods such as replication, or linear interpolation. Once the error diffusion process is performed on all the pixels in the rotated quasi-grayscale image, the image has been converted to a high addressability rotated binary image.

The rotated binary image generated by the post-rotation subsystem 270 includes, as the dominant structure, the halftone pattern of the high addressability binary original image. The filtering process and/or averaging process performed by the image filtering circuit 256 and the image resampling circuit 258, in conjunction with the subsequent secondary high addressability halftoning performed by the image high addressability halftone circuit 272, adds a small degree of randomness to the rotated binary image, while still preserving the dominant structure. That is, the error diffusion process is not cyclical in nature and thus does not result in any periodicities that would degrade the structure of the original image. In experimentation of the invention, this randomness has been observed to aid in the suppression of gray-level contours and pattern artifacts.

Alternatively, the image high addressability halftone circuit 272 may re-halftone the rotated quasi-grayscale image using a stochastic screening process. Stochastic screening is a halftoning technique available in various printing devices, for example. In stochastic screening, the halftoned image includes a multitude of pixels. The image density of the halftoned image depends on the number of pixels in a given area that are turned on. As should be apparent, as more pixels in a given area are turned "on," i.e., made black, the generated image will appear darker. In contrast, as more pixels in a given area are turned "off," i.e., made white, the image will appear lighter.

Accordingly, the stochastic screening process usable by the image high addressability halftone circuit 272 converts the rotated quasi-grayscale image to a high addressability binary image. Mapping the grayscale image to the halftoned image may be accomplished by analyzing blocks of quasi-grayscale pixels, in the fast scan direction, and transforming each block of the quasi-grayscale image to a block of the halftoned image pixels. The block of pixels in the halftoned image possess a varying density of "on" pixels, based on the grayscale value in the corresponding quasi-grayscale block. Further, the quasi-grayscale block of each respective image may be divided into sampling regions in the fast scan direction. Accordingly, high addressability is introduced to provide a finer resolution in the fast scan direction, i.e., in the direction along the raster line. Once the stochastic screening process is performed on the entire rotated quasi-grayscale image, the image has been converted to a rotated high addressability binary image.

As a result of the stochastic screening process performed by the image high addressability halftone circuit 272, the rotated high addressability binary image is generated. This rotated high addressability binary image may be directly output by the terminating circuit 276 to the image data sink 300. Alternatively, the terminating circuit 276 may store the image in the holding image memory 246.

In accordance with this illustrative example using the image rotation system 200, the process according to the invention is performed using a computer. However, it should be recognized that the systems and methods of the invention are not limited to application using a computer. Rather, the systems and methods according to the invention may be implemented using any suitable arrangement of electronic and imaging components, expert knowledge, or alternatively, a mixture of electronic and imaging components in conjunction with expert knowledge.

The image rotation process according to the invention may be applied to a variety of applications and environments. Further, it should be recognized that numerous variations of the systems and methods in accordance with the invention may be performed using the general process described in conjunction with FIGS. 2–5. Illustratively, further embodiments of the image rotation process according to the systems and methods of the invention are described below. Each of these illustrative embodiments are performed by the image rotation system 200. However, any suitable computer system or arrangement of imaging components may be used in the implementation of further embodiments. Further, it should be recognized that the processes in accordance with the systems and methods of the invention may be performed by hand, using hand calculations, for example.

Further, it should be recognized that, in accordance with the systems and methods of the invention, the order of the described processes may be varied. One example is that a high addressable group of pixels could be defined to be a single isomorphic pixel with a value defined for the high-addressable bits that it contains. Then, this single isomorphic pixel is rotated. Once the single isomorphic pixel is rotated, the filtering and resampling, for example, may be performed in accordance with the systems and methods of the invention. In this case the filtering window is defined in a manner to account for the data being rotated prior to filtering. Thus, the steps may be re-ordered and an equivalent operation performed in accordance with the systems and methods of the invention.

In accordance with a further embodiment of the systems and methods of the invention, an original image is input from the image data source 100, for example. The original image possesses 4× addressability, i.e., the spatial increment in the fast scan direction is four times finer than the spatial increment in the slow scan direction. The pre-rotation subsystem 250 utilizes a conventional low-pass filtering process to initially requantize the original high addressability binary image. Specifically, the image filtering circuit 256 filters the original high addressability binary image using a low-pass filter with a 3×1 weighted window. In one exemplary embodiment of the weighted window according to this invention, the window possesses the weights (1-4-1). That is, the target pixel in the center of the window is weighted four times as much as the neighboring pixels on each side of the target pixel. Since the input image is represented in high addressability space, the filtering process performed by the image filtering circuit 256 introduces only a very minor degree of blurring of neighboring pixels due to the weighted nature of the window.

After the original high addressability binary image is filtered, the image is still a high addressability image. Accordingly, the filtered high addressability binary image is resampled by the image resampling circuit 258 of the pre-rotation subsystem 250. The image resampling circuit 258 averages blocks of the filtered high addressability pixels to generate single isomorphic pixels possessing normal addressability.

After the filtered image is averaged and resampled, the filtered and averaged normal addressability image is output to the image rotation circuit 260. The image rotation circuit 260 rotates the averaged normal addressability pixels. Then, the rotated normal addressability image is output to the post-rotation subsystem 270. Specifically, the image high addressability halftone circuit 272 in the post-rotation subsystem 270 uses a conventional dot halftoning process with some randomness, for example, the stochastic screening process described above, to convert the rotated image back to a high addressability image.

After the image high addressability halftone circuit 272 stochastically screens the rotated normal addressability image, the terminating circuit 276 stores the rotated high addressability image in the processed image memory 244, for example. Then, the rotated high addressability image is output to the image data sink 300 or, alternatively, stored in the holding image memory 246.

In another exemplary embodiment of the systems and methods of the invention, an original high addressability binary image is retrieved from the holding image memory 246, for example. The original high addressability binary image has a resolution of 2400×600×1, i.e., the image includes 2400 high addressability pixels per inch in the fast scan direction, 600 pixels per inch in the slow scan or process direction, and a bit depth of one, i.e., a bitmap. The original image is stored in the input image memory 242 for processing.

Then, the original image is processed by the image filtering circuit 256. Further, the image resampling circuit 258 processes the image using an error diffusion process. These two process may be performed in conjunction with each other or separately. As a result, the original high addressability binary image is transformed from a 2400× 600×1 image to a re-quantized image having a resolution of 600×600×4. That is, this re-quantized image has a bit depth of 4, representing 16 quantization levels. Accordingly, the pre-rotation subsystem 250 performs the low-pass filtering and the error-diffusion to quantize or re-quantize the original image. As a result, the pre-rotation subsystem 250 generates the re-quantized image. The re-quantized image is then input by the image rotation circuit 260.

The image rotation circuit 260 rotates the re-quantized image. The image rotation circuit 260 can use any of the rotation processes as described above, or any other known or later developed rotation process to rotate the re-quantized image. After rotating the re-quantized image, the rotated re-quantized image is input by the post-rotation subsystem 270 to re-halftone the rotated re-quantized image. Specifically, the image high addressability halftone circuit 272 of the post-rotation subsystem 270 uses an error diffusion process to halftone the rotated re-quantized image. The image high addressability halftone circuit 272 re-halftones the rotated re-quantized image at 4× high addressability. That is, the error diffusion process performed by the image high addressability halftone circuit 272 provides a spatial resolution in the fast scan direction that is four times finer than in the slow scan or process direction.

The resulting rotated re-halftoned image is output from the post rotation subsystem 270 and temporarily stored in the processed image memory 244. The final output image is output to the image data sink 300 or alternatively, stored in the holding image memory 246, for example.

Figure 8:
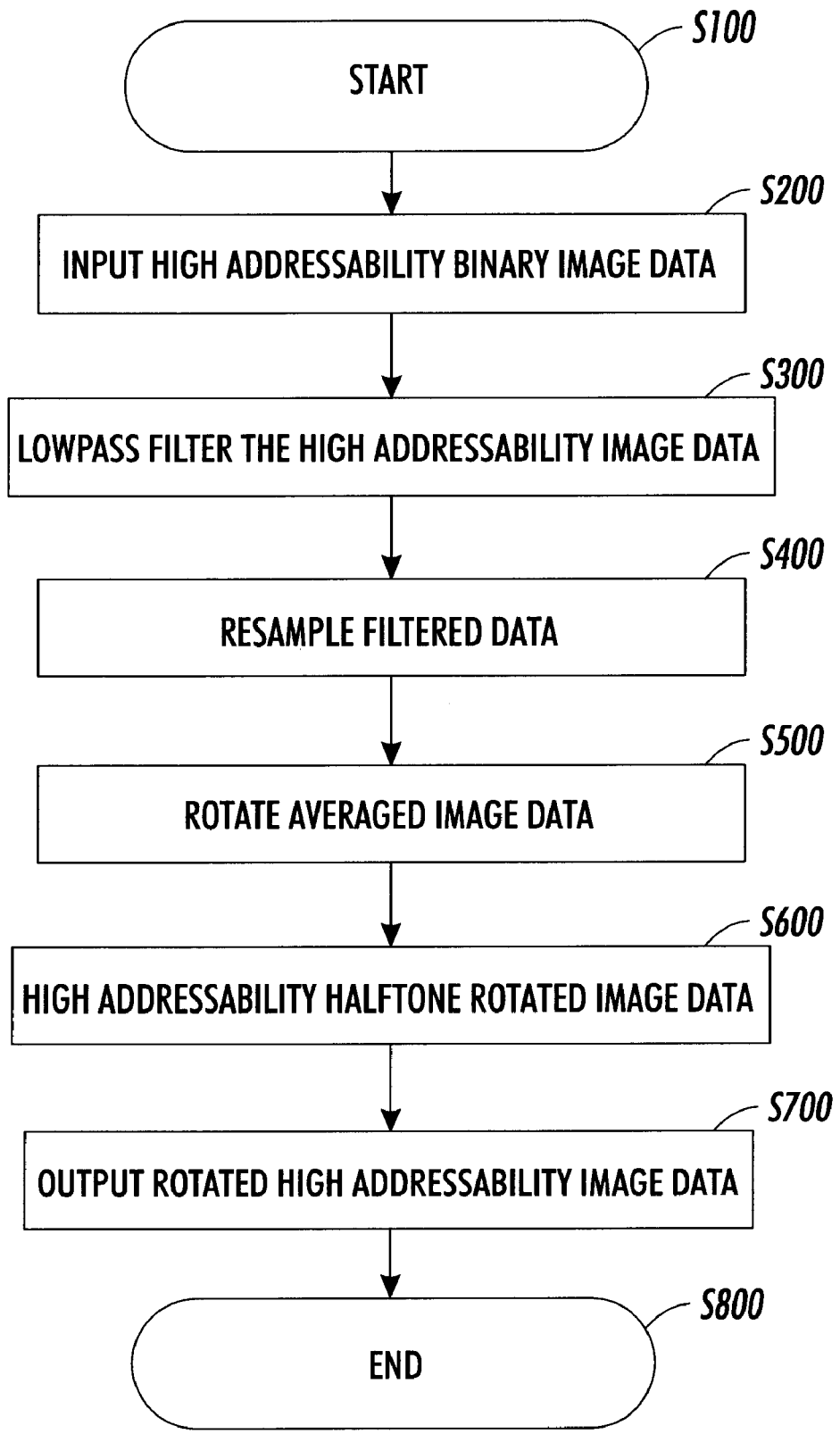
FIG. 8 is a flowchart outlining one exemplary embodiment of a method for rotating a high addressability binary image in accordance with this invention.

FIG. 8 is a flowchart outlining one exemplary embodiment of a rotation method according to this invention. As shown in FIG. 8, the rotation process begins in step S100, and continues to step S200.

In step S200, an original high addressability binary image is input. Then, in step S300, the high addressability image data is low-pass filtered. Then control of the rotation process passes to step S400. In step S400, the filtered image is resampled. The combination of steps S300 and S400 results in the generation of a quasi-grayscale image of normal addressability. Then control of the process passes to step S500.

In step S500, the resampled image data is rotated. Then, control continues to step S600. In step S600, the rotated image data is high addressability halftoned. After step 600, control passes to step S700. In step S700 the processed image is output to some suitable storage device or over a network, for example. Then, in step S800, the rotation process ends.

It should be appreciated that in these exemplary embodiments of the systems and methods of the invention, the high addressability binary original image is initially halftoned and transformed to a quasi-grayscale image possessing four levels of quantization. However, it should be recognized that the systems and methods in accordance with the invention are not limited to four levels of quantization. To the contrary, the quasi-grayscale image may possess a wide variety of grayscale levels, such as 8, 16, or 32, for example.

The image rotation system 200 shown in FIGS. 2–5 is preferably implemented on a programmed general purpose computer. However, the image rotation system 200 shown in FIGS. 2–5 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 8, can be used to implement the image rotation system 200.

In particular, it should be understood that each of the circuits shown in FIGS. 2–5 can be implemented as portions of a suitably programmed general purpose computer. Alternatively, each of the circuits shown in FIGS. 2–5 can be implemented as physically distinct hardware circuits within an ASIC, or using a FPGA, a PDL, a PLA or a PAL, or using discrete logic elements or discrete circuit elements. The particular form each of the circuits shown in FIGS. 2–5 will take is a design choice and will be obvious and predicable to those skilled in the art.

The memory 240 is preferably implemented using static or dynamic RAM. However, the memory 240 can also be implemented using a floppy disk and disk drive, a writable optical disk and disk drive, a hard drive, flash memory or any other known or later developed alterable volatile or non-volatile memory device or system.

While this invention has been described in conjunction with specific embodiments outlined above, it is evident that many alternative modifications and variations may be apparent to those skilled in the art. Accordingly, the exemplary embodiments of the invention as set forth herein are intended to be illustrative, not limiting. Various changes may be made without departing from the spirit and scope of the invention.

What is claimed is:

1. A method for rotating a high addressability binary image comprising:

processing the high addressability binary image to generate a quasi-grayscale image having normal addressability; comprising:

filtering the high-addressability binary image to generate a high addressability quasi-grayscale image;

resampling the high addressability quasi-grayscale image to generate a quasi-grayscale image having normal addressability;

rotating the normal addressability quasi-grayscale image; and converting the rotated quasi-grayscale image into a rotated high addressability binary image.

2. The method according to claim 1, wherein the filtering process includes a low-pass filtering process.

3. The method according to claim 2, wherein the low-pass filtering process includes a weighted averaging process.

4. The method according to claim 1, wherein filtering the high addressability binary image to generate high addressability quasi-grayscale image comprises:

observing neighborhood image data for a selected target pixel in the high addressability binary image; and generating a quasi-grayscale value for the selected target pixel based on the observed neighborhood image data.

5. The method according to claim 4, wherein generating a quasi-grayscale value for the selected target pixel based on the observed neighborhood image data comprises:

inputting the observed neighborhood image data into a look-up table; and extracting a quasi-grayscale value from the look-up table.

6. The method according to claim 1, wherein filtering the high addressability binary image to generate a high addressability quasi-grayscale image includes observing the high addressability binary image using a 3×1 observation window.

7. The method according to claim 6, wherein the observation window is weighted.

8. The method according to claim 7, wherein the observation window includes weighting the center pixel 4 times the weighting of the outside pixels.

9. The method according to claim 1, wherein resampling the high addressability quasi-grayscale image to generate a quasi-grayscale image having normal addressability includes an error-diffusion process.

10. The method according to claim 1, wherein resampling the high addressability quasi-grayscale image to generate a quasi-grayscale image having normal addressability includes averaging blocks of the high addressability quasi-grayscale image.

11. The method according to claim 1, wherein converting the rotated quasi-grayscale image into a rotated high addressability binary image includes halftoning.

12. The method according to claim 11, wherein halftoning the rotated quasi-grayscale image to generate a rotated high addressability binary image includes a high addressability halftoning process.

13. The method according to claim 11, wherein halftoning the rotated quasi-grayscale image to generate a rotated high addressability binary image includes an error diffusion process.

14. The method according to claim 13, wherein the error diffusion process includes linear interpolation.

15. The method according to claim 11, wherein halftoning the rotated quasi-grayscale image to generate a rotated high addressability binary image includes a stochastic screening process.

16. The method according to claim 1, wherein the high addressability binary image is rotated at least one of 90°, 180°, and 270°.

17. The method according to claim 1, wherein the high addressability binary image possesses 4× high addressability.

18. An image rotation system that rotates a high addressability binary image, the image rotation system comprising:
- an image filtering circuit that quantizes the high addressability binary image to generate a high addressability quasi-grayscale image;
- an image resampling circuit that converts the high addressability quasi-grayscale image to a normal addressability quasi-grayscale image;
- a rotation circuit that rotates the normal addressability quasi-grayscale image; and
- a conversion circuit that converts the rotated normal addressability quasi-grayscale image into a rotated high addressability binary image.

19. The image rotation system according to claim 18, wherein the image filtering circuit quantizes the high addressability binary image using a low-pass filter process.

20. The image rotation system according to claim 18, wherein the image resampling circuit converts the high addressability quasi-grayscale image to a normal addressability quasi-grayscale image using an error-diffusion process.

21. The image rotation system according to claim 18, wherein the conversion circuit is a halftoning circuit.

22. A printer comprising the image rotation system of claim 18.

23. A personal computer comprising the image rotation system of claim 18.

24. A facsimile machine comprising the image rotation system of claim 18.

* * * * *